(12) United States Patent
Sandham et al.

(10) Patent No.: US 8,024,555 B2
(45) Date of Patent: Sep. 20, 2011

(54) CONDITION CODE FLAG EMULATION FOR PROGRAM CODE CONVERSION

(75) Inventors: John H. Sandham, Manchester (GB); Geraint M. North, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 944 days.

(21) Appl. No.: 11/957,343

(22) Filed: Dec. 14, 2007

(65) Prior Publication Data
US 2008/0177985 A1 Jul. 24, 2008

Related U.S. Application Data

(63) Continuation of application No. 10/361,000, filed on Feb. 6, 2003, now Pat. No. 7,331,040, which is a continuation-in-part of application No. 10/314,179, filed on Dec. 5, 2002, now abandoned.

(30) Foreign Application Priority Data

Feb. 6, 2002 (GB) .................................. 0202728.2

(51) Int. Cl.
 *G06F 7/38* (2006.01)
 *G06F 9/45* (2006.01)
(52) U.S. Cl. .................... 712/226; 717/136; 717/144
(58) Field of Classification Search .................. 717/138, 717/136, 144; 712/226–228
See application file for complete search history.

(56) References Cited

U.S. PATENT DOCUMENTS

| | | | |
|---|---|---|---|
| 4,514,803 A | 4/1985 | Agnew et al. | |
| 4,812,975 A | 3/1989 | Adachi et al. | |
| 5,313,614 A | 5/1994 | Goettelmann et al. | |
| 5,329,471 A | 7/1994 | Swoboda et al. | |
| 5,408,637 A | 4/1995 | Shimizu et al. | |
| 5,440,702 A | 8/1995 | Brewer | |
| 5,551,015 A | 8/1996 | Goettelmann et al. | |
| 5,574,873 A | 11/1996 | Davidian | |
| 5,574,927 A | 11/1996 | Scantlin | |
| 5,577,233 A | 11/1996 | Goettelmann et al. | |
| 5,598,560 A | 1/1997 | Benson | |
| 5,606,696 A | 2/1997 | Ackerman et al. | |
| 5,649,203 A | 7/1997 | Sites | |
| 5,724,590 A | 3/1998 | Goettelmann et al. | |
| 5,737,631 A | 4/1998 | Trimberger | |
| 5,751,982 A | 5/1998 | Morley | |
| 5,768,593 A | 6/1998 | Walters et al. | |
| 5,805,792 A | 9/1998 | Swoboda et al. | |
| 5,805,895 A | 9/1998 | Breternitz et al. | |
| 5,870,575 A | 2/1999 | Kahle et al. | |

(Continued)

FOREIGN PATENT DOCUMENTS

JP 02-005139 A 1/1990

(Continued)

*Primary Examiner* — Anna Deng

(74) *Attorney, Agent, or Firm* — Matthew B. Talpis; James L. Baudino

(57) ABSTRACT

An emulator allows subject code written for a subject processor having subject processor registers and condition code flags to run in a non-compatible computing environment. The emulator identifies and records parameters of instructions in the subject code that affect status of the subject condition code flags. Then, when an instruction in the subject code is encountered, such as a branch or jump, that uses the flag status to make a decision, the flag status is resolved from the recorded instruction parameters. Advantageously, emulation overhead is substantially reduced.

10 Claims, 11 Drawing Sheets

U.S. PATENT DOCUMENTS

| | | | |
|---|---|---|---|
| 5,890,000 A | 3/1999 | Aizikowitz et al. |
| 5,901,308 A | 5/1999 | Cohn et al. |
| 5,903,760 A | 5/1999 | Farber et al. |
| 5,925,124 A | 7/1999 | Hilgendorf et al. |
| 5,930,509 A | 7/1999 | Yates et al. |
| 5,946,491 A | 8/1999 | Aizikowitz et al. |
| 5,956,495 A | 9/1999 | Kahle et al. |
| 5,966,539 A | 10/1999 | Srivastava |
| 5,983,335 A | 11/1999 | Dwyer, III |
| 6,000,028 A | 12/1999 | Chernoff et al. |
| 6,009,261 A | 12/1999 | Scalzi et al. |
| 6,031,994 A | 2/2000 | Radigan |
| 6,076,155 A | 6/2000 | Blomgren et al. |
| 6,077,314 A | 6/2000 | Ng |
| 6,091,897 A | 7/2000 | Yates et al. |
| 6,105,124 A | 8/2000 | Farber et al. |
| 6,126,329 A | 10/2000 | Bennett et al. |
| 6,170,083 B1 | 1/2001 | Adl-Tabatabai |
| 6,185,675 B1 | 2/2001 | Kranich et al. |
| 6,199,095 B1 | 3/2001 | Robinson |
| 6,205,545 B1 | 3/2001 | Shah et al. |
| 6,223,339 B1 | 4/2001 | Shah et al. |
| 6,301,705 B1 | 10/2001 | Doshi et al. |
| 6,308,318 B2 | 10/2001 | Krishnaswamy |
| 6,321,379 B1 | 11/2001 | Callahan, II |
| 6,330,691 B1 | 12/2001 | Buzbee et al. |
| 6,360,194 B1 | 3/2002 | Egolf |
| 6,367,067 B1 | 4/2002 | Odani et al. |
| 6,427,234 B1 | 7/2002 | Chambers et al. |
| 6,434,741 B1 | 8/2002 | Mirani et al. |
| 6,463,582 B1 | 10/2002 | Lethin et al. |
| 6,477,641 B2 | 11/2002 | Davis |
| 6,502,237 B1 | 12/2002 | Yates et al. |
| 6,505,296 B2 | 1/2003 | Morris |
| 6,522,985 B1 | 2/2003 | Swoboda et al. |
| 6,523,173 B1 | 2/2003 | Bergner et al. |
| 6,526,572 B1 | 2/2003 | Brauch et al. |
| 6,530,078 B1 | 3/2003 | Shmid et al. |
| 6,530,079 B1 | 3/2003 | Choi et al. |
| 6,535,903 B2 | 3/2003 | Yates et al. |
| 6,539,471 B2 | 3/2003 | Sheaffer et al. |
| 6,539,541 B1 | 3/2003 | Geva |
| 6,549,987 B1 | 4/2003 | Rappoport et al. |
| 6,564,297 B1 | 5/2003 | Kosche |
| 6,594,824 B1 | 7/2003 | Volkonsky et al. |
| 6,631,514 B1 | 10/2003 | Le |
| 6,643,630 B1 | 11/2003 | Pegatoquet et al. |
| 2002/0026633 A1 | 2/2002 | Koizumi et al. |
| 2003/0149963 A1* | 8/2003 | Sandham et al. ............ 717/138 |

FOREIGN PATENT DOCUMENTS

| | | |
|---|---|---|
| JP | 03-087930 A | 4/1991 |
| WO | WO 92/15939 | 9/1992 |
| WO | WO 97/50031 | 12/1997 |

\* cited by examiner

Example 1

| line | instruction | operands | flag(s) |
|---|---|---|---|
| 1 | Sub | R1, R2 | ⇒ z,s,o |
| 2 | Bez | | ⇒ z |

Example 2

| line | instruction | operands | flag(s) |
|---|---|---|---|
| 1 | Sub | R1, R2 | ⇒ z,s,o |
| 2 | Ble | | ⇒ z,s,o |

|   | Operation | Flags Affected | Type | OperandA | OperandB |
|---|---|---|---|---|---|
| 1 | sub eax,$1 | of,sf,zf,af,pf,cf | SubLong | eax | $1 |
| 2 | inc ebx | of,sf,zf,af,pf | Normalized | | |
| 3 | sub eax,ecx | of,sf,zf,af,pf,cf | SubLong | eax | ecx |
| 4 | inc edx | of,sf,zf,af,pf | Normalized | | |
| 5 | sub eax,ecx | of,sf,zf,af,pf,cf | SubLong | eax | ecx |
| 6 | ja (eax > ecx) | | | | |

Fig 5

| Subject code | Core IR | Target code | GDCE |
|---|---|---|---|
| cmp ecx,eax<br>jne | operand_a = ecx<br>operand_b = eax<br>flag_status = SubLong<br>branch_condition =<br>  (operand_a != operand_b) | ~~or r1<opA>,r6<ecx>,r6<ecx>~~<br>~~or r2<opB>,r7<eax>,r7<eax>~~<br>bne r6<ecx>,r7<eax> | X<br>X |

Fig 6

| | Recorded instruction parameters | | | Comment |
|---|---|---|---|---|
| inst_1 | $type_1$ | operand $A_1$ | operand $B_1$ | affects full flag-set |
| inst_2 | $type_2$ | operand $A_2$ | operand $B_2$ | affects partial flag set |

Fig 7

| Line | Instruction | Operands |
|---|---|---|
| 1 | add | %esi,%ecx |
| 2 | mov | ... |
| 3 | dec | %eax |
| 4 | jz | Label |

Fig 8

| 0 | | | Condition Fields (0-7) | | | | | 31 |
|---|---|---|---|---|---|---|---|---|
| CF0 | CF1 | CF2 | CF3 | CF4 | CF5 | CF6 | CF7 | |
| $LT_0\ GT_0\ EQ_0\ SO_0$ | $LT_1\ GT_1\ EQ_1\ SO_1$ | ... | ... | ... | ... | ... | $LT_7\ GT_7\ EQ_7\ SO_7$ | |

Fig 9

| | Recorded instruction parameters | | | Comment |
|---|---|---|---|---|
| inst0 | $type_0$ | operand $A_0$ | operand $B_0$ | instruction affecting $CF_0$ |
| inst1 | $type_1$ | operand $A_1$ | operand $B_1$ | instruction affecting $CF_1$ |
| ... | ... | ... | ... | ... |
| instn | $type_n$ | operand $A_n$ | operand $B_n$ | instruction affecting $CF_n$ |

Fig 10

Recorded Instruction Parameters

CONDITION CODE FLAG EMULATION FOR PROGRAM CODE CONVERSION

CROSS REFERENCE TO RELATED APPLICATIONS

This application is a continuation of U.S. application Ser. No. 10/361,000, filed Feb. 6, 2003 which is a continuation-in-part of U.S. application Ser. No. 10/314,179, filed Dec. 5, 2002, and foreign priority benefits of GB Application Serial No. 0202728.2, filed Feb. 6, 2002, incorporated by reference herein.

BACKGROUND

The present invention relates in general to the field of program code conversion. In particular, the invention relates to a method and apparatus for emulation of condition code flags.

In the field of computer processing, it is often desired to run program code written for a computer processor of a first type (a "subject" processor) on a processor of a second type (a "target" processor). Here, an emulator is used to perform program code translation, such that the subject program is able to run on the target processor. The emulator provides a virtual environment, as if the subject program were running natively on a subject processor, by emulating the subject processor.

Most conventional computer processors comprise a set of registers, which are a small number of high-speed memory locations closely associated with the processor. The registers can be contrasted with general random access memory provided remote from the processor, which is slower but has a much larger capacity. Typically, a modern processor includes of the order of 32 to 144 registers. The limited size and high speed of the registers make them one of the most critical resources in almost all computer architectures.

The registers are usually augmented with a set of condition code flags. The condition code flags are set or cleared such as in response to the execution of instructions in the processor and are used to represent the outcome of various operations. The value of one or more of the condition code flags is often used as the basis for a decision during execution of a sequence of instructions. Hence, in the context of program code conversion, it is critical to accurately emulate the condition code flags.

Whilst there tends to be some overlap between the set of condition code flags of a subject processor and the set of condition code flags of a target processor, in almost all cases there is not an exact correspondence between the two sets of flags. Therefore, accurately emulating the subject condition code flags can be an expensive operation. The degree to which flag emulation impacts upon the efficiency of the conversion process varies according to compatibility of the subject processor architecture with the target processor architecture, but in general the emulation of subject condition code flags amounts to a significant proportion of overall performance.

A further problem arises in that some processor architectures are inherently highly incompatible. Some processors are strongly reliant on the use of condition code flags, whereas some other processors do not provide any condition code flags at all. For example, it is very expensive to provide an emulator able to convert subject code written for a subject processor which does use condition code flags to run on a target processor without any condition code flags.

INVENTION SUMMARY

An aim of the present invention is to provide a method for emulating condition code flags that addresses the problems of the prior art, particularly those problems set out above.

A preferred aim of the present invention is to provide a method for emulating condition code flags that is efficient and reduces overall cost of program code conversion.

According to a first aspect of the present invention there is provided a method for emulating condition code flags during program code conversion, comprising the steps of: (a) identifying a flag-affecting instruction in a sequence of subject code instructions; (b) recording parameters of the identified flag-affecting instruction; (c) detecting a flag-usage instruction in the sequence of subject code instructions; and (d) resolving a flag status with respect to the recorded parameters.

In a first preferred embodiment, preferably the step (d) comprises explicitly calculating a flag status by emulating effects of the identified flag-affecting instruction on one or more subject condition code flags. Preferably, the step (b) comprises setting a flag status indicator to a pending state to indicate that parameters have been recorded, and the step (d) comprises setting the flag status indicator to a normalized state to indicate that a flag status has been explicitly calculated.

In a second preferred embodiment, preferably the step (d) comprises implicitly determining flag status with reference to the recorded parameters.

The first and second preferred embodiments can be used in combination. Preferably, the step (c) comprises determining a flag usage type with reference to a type of the detected flag-usage instruction, and the step (d) comprises resolving flag status either by explicitly calculating a flag status or by implicitly determining a flag status, according to the determined flag usage type.

Preferably, the step (a) comprises identifying a second flag-identifying instruction in the sequence of subject code instructions, and the step (b) comprises replacing the recorded parameters with parameters of the second flag-affecting instruction. Here, the recorded parameters are replaced as each new flag-affecting instruction is encountered. Alternatively, parameters are recorded for a plurality of instructions.

Preferably, the step (a) comprises identifying a type of flag-affecting instruction as one of a plurality of predetermined types, and the step (b) comprises recording parameters for each type of flag-affecting instruction.

In one embodiment, preferably, the predetermined types include a first type instruction affecting a full set of condition code flags, and a second type instruction affecting a subset of the full set of condition code flags. Preferably, the step (d) comprises resolving flag status for a full set of condition code flags with respect to the recorded first-type parameters, and resolving flag status with respect to the subset of the condition code flags with respect to the recorded second-type parameters. Preferably, the step (d) comprises explicitly determining flag status from the recorded first-type parameters, and modifying the explicitly determined flag status from the recorded second-type parameters.

In a second embodiment, preferably the predetermined types include instruction types each affecting a condition code flag set amongst a plurality of condition code flag sets.

Preferably, the recorded parameters include an instruction type parameter and one or more instruction operand parameters. In one embodiment, the parameters are recorded in dedicated storage locations, such as predetermined locations in a main memory. The parameters are suitably copied to such location. However, recording an instruction operand parameter may comprise storing a reference to a location containing an operand. Here, recording an instruction operand parameter comprises determining that an operand remains available unmodified at an original location and storing a reference to the original location as the instruction operand parameter, or else copying the operand from the original location to a dedicated operand parameter storage location. Preferably, the method comprises providing a plurality of abstract registers representing registers of a subject processor, and supplementing the abstract registers with one or more additional abstract registers each for storing an operand as an instruction operand parameter.

According to a second aspect of the present invention there is provided a method for emulating condition code flags during program code conversion, comprising: selecting a sequence of subject code instructions; identifying a flag-affecting instruction in the sequence of subject code instructions, the flag-affecting instruction specifying an operation that affects subject condition code flags of a subject processor; recording parameters of the identified flag-affecting instruction including an instruction type parameter and one or more operand parameters; detecting a flag-usage instruction in the sequence of subject code instructions, the flag-usage instruction specifying an operation with reference to a flag status of one or more of the subject condition code flags; and in response to detecting a flag-usage instruction, resolving a flag status of one or more of the subject condition code flags with respect to the recorded parameters.

The method preferably comprises updating the recorded parameters when a new flag-affecting instruction is encountered in the sequence of subject code instructions. Parameters may be recorded for a plurality of flag-affecting instructions. In one embodiment the plurality of instructions are each associated with differing sets of subject condition code flags.

Preferably, the method comprises resolving flag status by at least one of (a) explicitly calculating a status for one or more subject condition code flags by emulating an effect of the recorded flag-affecting instruction, or (b) implicitly representing the flag-usage instruction using the recorded parameters, or (c) selecting between options (a) and (b) according to a type of the flag-usage instruction.

Preferably, the recorded parameters include at least one instruction operand parameter, and wherein recording the instruction operand parameter comprises at least one of (a) copying an operand to a predetermined storage location, or (b) storing a reference to an original location containing the operand, or (c) selectively performing (a) or (b).

According to a third aspect of the present invention there is provided an emulator apparatus for use in a target computing environment for emulating a subject processor of a subject computing environment when translating subject code appropriate to the subject computing environment to produce target code appropriate to the target computing environment, the emulator apparatus comprising: means for identifying a flag-affecting instruction in a sequence of subject code instructions; an instruction parameter store for recording parameters of the identified flag-affecting instruction; means for detecting a flag-usage instruction in the sequence of subject code instructions; and means for resolving a flag status with respect to the instruction parameters recorded in the instruction parameter store.

The invention also extends to a computing platform embodying the emulator apparatus and/or arranged to perform the methods defined herein. The computing platform may take any suitable form including, for example, a networked computing system, a server computer, a desktop computer, or a portable computing device. The invention also extends to a computer readable recording medium containing program code instructions for performing any of the methods defined herein.

For a better understanding of the invention, and to show how embodiments of the same may be carried into effect, reference will now be made, by way of example, to the accompanying diagrammatic drawings in which:

BRIEF DESCRIPTION OF DRAWINGS

FIG. 5 shows an example of subject program code together with recorded instruction parameters;

FIG. 6 shows program code during translation from a subject environment to a target environment;

FIG. 7 shows a preferred arrangement for storing instruction parameters;

FIG. 8 shows an example of subject program code;

FIG. 9 shows a condition register of condition code flags in an example subject processor;

FIG. 10 shows a preferred arrangement for storing instruction parameters;

DETAILED DESCRIPTION

Figure 1:
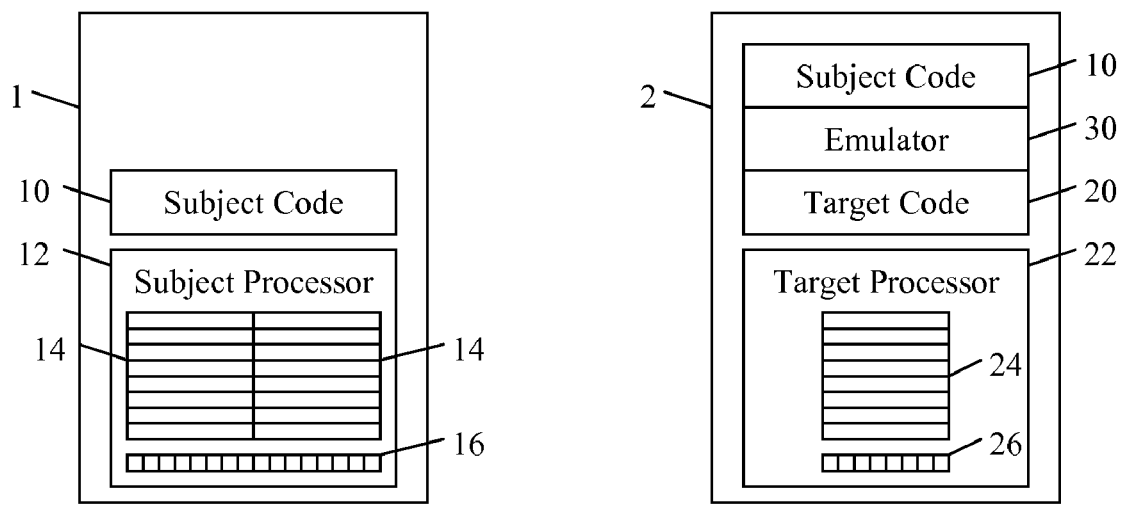
FIG. 1 shows an example computing environment including subject and target computing environments.

Referring to FIG. 1, an example computing environment is shown including a subject computing environment 1 and a target computing environment 2. In the subject environment 1, subject code 10 is executable natively on a subject processor 12. The subject processor 12 includes a set of subject registers 14 and a set of subject condition code flags 16. Here, the subject code 10 may be represented in any suitable language with intermediate layers (e.g., compilers) between the subject code 10 and the subject processor 12, as will be familiar to the skilled person.

It is desired to run the subject code 10 in the target computing environment 2, which provides a target processor 22 using a set of target registers 24 and a set of target condition code flags 26. As a typical example, the subject processor 12 is a member of the Intel® x86 family of processors, whilst the target processor 22 is a member of the PowerPC® processor family. These two processors are inherently non-compatible. Firstly, these two processors use different instruction sets. Secondly, an x86 processor uses two flags (the auxiliary flag and the parity flag) which are unique to that family and are not provided in the PowerPC® architecture. Hence, an emulator 30 is provided in the target computing environment 2, in order to run the subject code 10 in that non-compatible environment.

The emulator 30 performs a translation process on the subject code 10 and provides a translated target code 20 to the target processor 22. Suitably, the emulator 30 performs binary translation, wherein subject code 10 in the form of executable binary code appropriate to the subject processor 12 is translated into executable binary code appropriate to the target processor 22.

Translation can be performed statically, or dynamically. In static translation, an entire program is translated prior to execution of the translated program on the target processor. This involves a significant delay. Therefore, emulators have been developed which dynamically translate small sections of the subject code 10 for execution immediately on the target processor 22. This is much more efficient, because large sections of the subject code 10 will not be used in practice, or will be used only rarely. The preferred embodiment of the present invention is particularly intended for use with an emulator 30 that performs dynamic binary translation of the subject code 10 into target code 20 executable on the target processor 22.

In executable form, the subject code 10 provides instructions that directly or indirectly make use of the subject registers 14 and the subject condition code flags 16. Hence, it is desired to emulate the effects of those instructions, in order to provide an accurate translation of the subject code 10. However, since the target condition code flags 26 are not directly compatible with the subject condition code flags 16, emulation of the subject condition code flags 16 in the target computing environment is expensive in terms of both time and resources.

It is desired to provide emulation of condition code flags in a manner which is cost efficient in the target processor. Further, it is desired that the emulation method can be performed efficiently in many different types of target processor. Ideally, it is desired to allow efficient emulation even in a target processor which does not provide any condition code flags.

Figure 2:
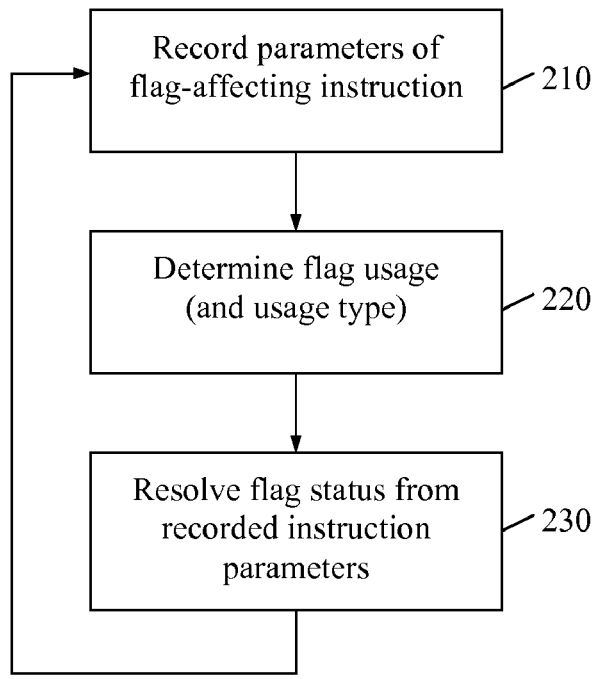
FIG. 2 outlines a preferred method for emulating condition code flags.

FIG. 2 shows a first preferred embodiment of a method for emulating condition code flags. In step 210, parameters of a flag-setting instruction are recorded. Conveniently, certain instructions are known to affect one or more of the condition code flags, whilst other instructions are known to have no affect on the condition code flags. Hence, when translating a sequence of instructions in the subject code 10, an instruction which potentially affects flag settings is identified. Parameters of that flag-affecting instruction are then stored, to be available later.

In step 220, a flag usage is detected. That is, it is known that some instructions in the instruction set of the subject code 10 make use of one or more of the subject condition code flags 16, such as to make a branch or jump decision based on the value of a condition code flag. At this point, it is desired to know the real values of those flags.

Step 230 comprises resolving a value for the condition code flags, at least for the one or more flags where a usage has been detected, from the recorded parameters of the flag-affecting instruction.

In this method, flag emulation is deferred until the last possible moment. Instruction parameters are recorded for a potentially flag-affecting instruction. Then, when it is necessary to emulate the flag, such as when the flags are used as the basis for a decision, the recorded instruction parameters are used to resolve the necessary flag or flags at that point. Here, the flag-affecting instruction is emulated including explicit emulation of the effect of that instruction on the subject condition code flags. However, since full flag emulation is only performed when a flag-using instruction is encountered, overhead associated with flag emulation is significantly reduced and emulator performance is substantially enhanced.

Once the flag values have been resolved, they remain valid until a new flag-affecting instruction is encountered. At that point, the parameters of the flag-affecting instruction are again recorded, as in step 210. Conveniently, the emulated condition code flags are marked as either being in a normalised, explicitly calculated state, or else in a pending state to be resolved with reference to a recorded flag-affecting instruction.

Figures 3, 4:
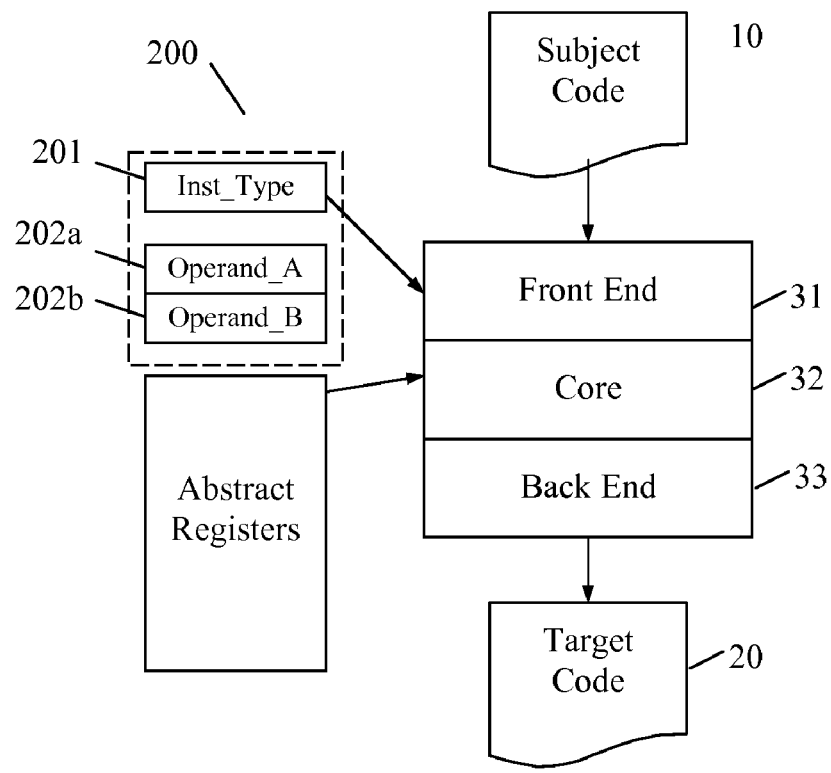
FIG. 3 shows two examples of subject program code.
FIG. 4 shows a preferred emulator.

FIG. 3 shows two example instruction sequences to illustrate the method of FIG. 2. In a simple first example, the instruction at line 1 affects the subject condition code flags "z," "s," and "o," with the "z" flag subsequently utilised by the conditional branch instruction at line 2. In this example, the first instruction (Sub) subtracts the value of register R2 from the value in register R1, and the branch (Bez) is effected if the result is equal to zero. The parameters of the instruction on line 1 are recorded, and are then used to determine the value of the flag "z" for the instruction on line 2. In the second more complex example, the instruction (Ble) on line 2 branches if the result of the subtraction is less than or equal to zero, this decision being made with reference to the example condition code flags "z", "s", and "o".

As an enhancement of this first method, it has been found that for most flag-using instructions it is not necessary to explicitly calculate the value of each flag. That is, the value of a flag can be determined implicitly, with reference to the stored parameters of the flag-affecting instruction.

Referring to the code examples of FIG. 3, the branch decision in line 2 can be made simply based upon the parameters of the preceding flag-affecting instruction in line 1. That is, the flag value "z" can be determined implicitly based upon the recorded instruction parameters and there is no need to explicitly determine the value of the flag "z." Hence, the step 220 advantageously comprises determining a flag usage, and determining a flag usage type. The step 230 then comprises either explicitly determining flag values, or else implicitly determining flag values from recorded instruction parameters, based upon the determined flag usage type.

Instruction combinations similar to those shown in FIG. 3 occur very frequently. Hence, this optimisation has a significant impact.

The example instruction sequences shown in FIG. 3 provide a flag-affecting instruction (Sub) followed immediately by a flag-using instruction (Bez or Ble). However, it is also possible that one or more intervening sterile instructions are present between example lines 1 and 2, which do not affect or use the relevant flag or flags.

Referring now to FIG. 4, the emulator 30 of the preferred embodiment is illustrated in more detail, comprising a front end 31, a core 32 and a back end 33.

The front end 31 is configured specific to the subject processor 12 being emulated. The front end 31 takes a predetermined section of the subject code 10 and provides a block of a generic intermediate representation (an "IR block").

The core 32 optimises each IR block generated by the front end 31 by employing optimisation techniques, such as dead code elimination, which need not be described here in detail.

The back end 33 takes optimised IR blocks from the core 32 and produces target code 20 executable by the target processor 22.

Suitably, the front end 31 divides the subject code 10 into basic blocks, where each basic block is a sequential set of instructions between a first instruction at a unique entry point and a last instruction at a unique exit point (such as a jump, call or branch instruction). The core 32 may select a group block comprising two or more basic blocks which are to be treated together as a single unit. Further, the front end 31 may form iso-blocks representing the same basic block of subject code under different entry conditions.

In use, a first predetermined section of the subject code 10 is identified, such as a basic block, and is translated by the emulator 30 running on the target processor 22 in a translation mode. The target processor 22 then executes the corresponding optimised and translated block of target code 20.

The preferred emulator 30 includes a plurality of abstract registers 320, suitably provided in the core 32, which represent the physical subject registers 14 that would be used within the subject processor 12 to execute the subject code 10. The abstract registers define the state of the subject processor 12 being emulated by representing the expected effects of the subject code instructions on the subject processor registers.

FIG. 4 also shows a preferred implementation of the flag emulation method, suitable for use in the general emulator architecture described above. When a flag-affecting instruction is identified in the subject code 10, parameters of that instruction are recorded in an instruction parameter store 200. Most conveniently, the stored instruction parameters include an instruction type 201, and one or more instruction operands 202. For example, in a x86 type processor each instruction can operate on a maximum of two operands, and therefore two operand parameters 202a and 202b are recorded. The instruction type parameter 201 together with the one or more operand parameters 202 provide sufficient information for each of the emulated subject condition code flags 16 to be resolved either explicitly, or implicitly.

The one or more operand parameters 202 are suitably represented as one or more abstract registers additional to the emulated set of subject registers 14. That is, the emulator 30 of target computing environment 2 emulates the set of subject registers 14, by using abstract registers, and supplements this set of abstract registers with one or more additional registers to store the instruction operand parameters. Hence, the operand parameters 202, which are dynamic quantities, are available in the target processor 12 in a high speed memory location and the values of the subject condition code flags 16 are resolvable quickly and cheaply, such as via suitable dynamic target code. The instruction type parameter 201, which is a statically determinable quantity, is suitably stored in a slower or more remote location in the target computing environment 2, such as in main memory, and is associated with a corresponding section of code such as a basic block.

As shown in FIG. 4, in this first preferred embodiment only the most recent flag-affecting instruction is recorded. As each new flag-affecting instruction is encountered in the sequence of instructions in the subject code 10, then the recorded parameters are replaced with those of the latest encountered flag-affecting instruction. That is, as each new flag-affecting instruction is encountered, the instruction parameters are replaced with those of that new flag-affecting instruction.

To further illustrate the preferred embodiments of the present invention, FIG. 5 shows six lines of example subject code. Some of the instructions (Sub) affect the full set of condition code flags o, s, z, a, p & c, whilst other instructions (Inc) affect only a subset of the condition code flags. The third column records the instruction type, whilst the fourth and the final columns record the two operands A & B referenced by that instruction. In this example, "Normalised" refers to the normalised status of the flag values, while "SubLong" refers to an instruction type, namely a long (32 bit) subtraction operation in an example x86 processor. EAX, EBX, ECX and EDX are example subject registers.

In use, the emulator forms predetermined sections of subject code such as basic blocks, and records entry conditions giving the status of the emulation when passing from one basic block into another. That is, the emulator records entry conditions which are used to define the current status of the emulation at entry into a new basic block. These entry conditions include, for example, the status of each abstract register, and the status of the condition code flags. In FIG. 5, the "Inc" instructions in lines 2 and 4 which affect a subset of the flags require the flags to be explicitly determined and the status is shown as normalised. The "Sub" instructions on the other hand put the flags into the pending state and the parameters of that flag-affecting instruction are recorded. When it comes to the jump "JA" instruction in line 6, the condition code flags are emulated indirectly derived from the recorded parameters of the "Sub" instruction in line 5.

FIG. 6 illustrates the preferred emulation method during translation of the subject code into target code. In the first column an example pair of instructions are shown, in this case a compare (Cmp) instruction and a jump if not equal to zero (Jne) instruction. The front end 31 of the emulator 30 determines that these instructions form a basic block. The second column shows the same instructions, set out as standardised intermediate representation in the core 32. The third column shows the resulting target code produced by the back end 33. This example shows subject code appropriate to an x86 processor being emulated by an MIPS processor. The architecture of a MIPS processor does not provide any target condition code flags. This example illustrates a worst case practical situation, because traditionally the condition code flags of the x86 processor are very expensive to emulate in the flagless MIPS processor. The fourth column of FIG. 6 shows that two lines of target code produced from the intermediate representation can be removed by global dead code elimination during an optimisation phase performed by the emulator. Hence, the two lines of subject code in the first column result in a single line of target code in the third column.

As illustrated by the simple example in FIG. 6, the emulation method described herein can be efficiently implemented even for highly non-compatible environments. Flag emulation is not required at all for a large percentage of instructions, i.e. for sterile instructions. Further, in many instances flag status can be derived implicitly from the recorded instruction parameters. Only a small percentage of the instructions in the source code require full normalised emulation of the subject condition code flags. As practical examples, instructions such as subtraction (Sub) or compare (Cmp) or test (Tst) which occur frequently in source code written such as for x86 subject processors can be emulated without any need for explicit resolution of the subject condition code flags.

In the implementation described above, the last flag-affecting instruction is recorded simply and easily by using additional abstract registers to represent each operand. In this architecture, an additional abstract register is provided for each potential operand. In the example of an x86 processor, each instruction can act on at most two operands, and therefore two additional operand parameter registers are employed. Sometimes, however, it is advantageous to record additional instruction parameters, as will now be described below.

FIG. 7 shows a preferred implementation for recording multiple sets of instruction parameters. In this example, two sets of instruction parameters are provided, namely inst_1 and inst_2.

For some types of processor, there are instructions which affect only a subset of the subject condition code flags, whilst other instructions affect the full set of subject condition code flags. As one option, this problem is overcome by explicitly determining the full set of flag values from the last full set flag-affecting instruction, and then explicitly determining the flag values of the subset affected by the subset-affecting instruction. The full set of flag values can then be determined by combining the explicitly determined flag values of the last full-set flag affecting instruction with those of the newly encountered subset affecting instruction.

FIG. 8 shows four lines of subject code to illustrate the use of the first and second recorded instruction parameters of FIG. 7. The add instruction (add) at line 1 affects the complete flag set, whereas the decrement instruction (dec) at line 3 affects only a subset of the flags. The embodiment described above would require an explicit definition of the flags at line 3, by first normalizing the flags with reference to the instruction parameters recorded for line 1. However, by providing two sets of instruction parameters as shown in FIG. 7, it is now possible to record both instructions, from lines 1 and 3, without needing to normalise the flags at either point. When the flag-using jump instruction is encountered at line 4, the values of the condition code flags are resolved explicitly or implicitly from the two sets of stored instruction parameters.

FIGS. 9 and 10 illustrate another preferred implementation of the emulation method for use with processors such as the PowerPC® family which make use of a number of identical flag sets.

FIG. 9 shows the condition register used in a typical PowerPC processor using eight 4-bit condition fields (CF) which each contain four flags, namely less than (LT), greater than (GT), equal to (EQ) and summary overflow (SO). In this processor architecture, a flag-setting operation is allowed to selectively modify one of the eight sets of flags. Further, although most instructions will set every flag in the specified flag set, some operations exist which affect the status of specific flags. Hence, in traditional emulation systems, it is relatively expensive to emulate a processor of this nature.

A majority of modifications to the condition code flags in the condition register are initiated by compare instructions, which perform a signed or unsigned comparison of two values. One of the three comparison flags within the specified condition field ($LT_n$, $GT_n$ or $EQ_n$, where n=0 . . . 7) is set, while the other two are cleared. In order to emulate this relatively complex set of subject condition code flags, it is convenient to provide a set of recorded instructions such that instruction parameters are recorded for each of the condition fields. In this example, as shown in FIG. 10, instruction parameters are recorded for each of "n" instructions, such that the last flag-affecting instruction can be recorded for each of the condition fields. If necessary, the embodiment of FIG. 10 can be combined with the embodiment of FIG. 8, to provide a plurality of recorded instructions for each of the condition fields.

Figure 11:
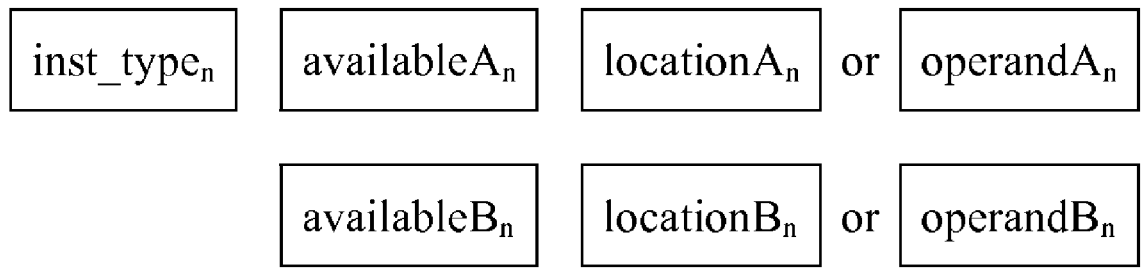
FIG. 11 shows another preferred arrangement for storing instruction parameters.

FIG. 11 shows a further preferred option to improve efficiency of emulation. In the embodiments discussed above, the operands of a flag affecting instruction are copied to operand registers so as to be available when it is necessary to resolve the flag status. However, in some circumstances it is possible to avoid this copying operation by referring instead to the original source location of that operand. That is, the operand value is validly recorded, for example, in an emulated subject register. Provided the value in that subject register remains unchanged, then the subject register itself can be used as the source of the value of that operand.

FIG. 11 in this example is adapted for the architecture of a PowerPC processor. For each operand $A_{0-n}$, $B_{0-n}$, two control fields are recorded. The first control field denotes whether the operand value has been copied to the dedicated operand register 202, or else denotes that the second field specifies the location which contains the value of this operand. That is, the second control field is used as a reference to a subject register (i.e., one of the abstract registers held by the emulator) which contains the value of the desired operand parameter. Here, the first control field is a single bit in length, while the second field is five bits in length, which is sufficient to address the available subject registers of this example processor.

In another preferred embodiment, the recorded operand parameters are only a subset of the operand parameters employed by the flag-affecting instruction. Firstly, when the flag-affecting instruction performs a reversible transformation and the result of the operation is still available when it is desired to resolve flag status, then the result together with a first operand can be used to infer a second operand. Secondly, if the flag-affecting operation has duplicate parameters, then it is sufficient to record just one of those parameters. These special-case flag-affecting instructions allow increased optimisation of the target code and further reduce overhead associated with emulation of condition code flags.

As indicated above, the advantages of the invention may be realized in translation code which performs run-time translation using the approach of generating intermediate representation (IR) of the subject code from which target code is then generated. Accordingly, a discussion of such an implementation incorporating the inventive aspects discussed heretofore is now provided together with illustrations of particular advantages realizable according to such representations.

IR Trees

As noted above and as disclosed in U.S. patent application Ser. No. 09/827,971 filed Apr. 6, 2001, incorporated by reference herein, in the process of generating translated code, intermediate representation ("IR") is generated based on the subject instruction sequence. The IR comprises abstract representations of the expressions calculated and operations performed by the subject program. Subsequently, translated code is generated based on the IR.

For example, the subject instruction
   add % r1, % r2, % r3
performs the addition of the contents of subject registers % r2 and % r3 and stores the result in subject register % r1. Thus, this instruction corresponds to the abstract expression "% r1=% r2+% r3." This example contains a definition of the abstract register % r1 with an add expression containing two subexpressions representing the instruction operands % r1 and % r2. In the context of a subject program, these subexpressions may correspond to other, prior subject instructions, or they may represent details of the current instruction such as immediate constant values.

When the "add" instruction is parsed, a new "+" IR node is generated, corresponding to the abstract mathematical operator for addition. The "+" IR node stores references to other IR nodes that represent the operands (held in subject registers, represented as subexpression trees). The "+" node is itself referenced by the appropriate subject register definition (the abstract register for % r1, the instruction's destination register).

As those skilled in the art will appreciate, in one embodiment the translator is implemented using an object-oriented programming language such as C++. For example, an IR node is implemented as a C++ object, and references to other nodes are implemented as C++ references to the C++ objects corresponding to those other nodes. An IR tree is therefore implemented as a collection of IR node objects, containing various references to each other. Prior to execution, the source code of the translator, whether implemented in C++ or another programming language, must be compiled into native target code consistent with the target architecture and target operating system.

Figure 17:
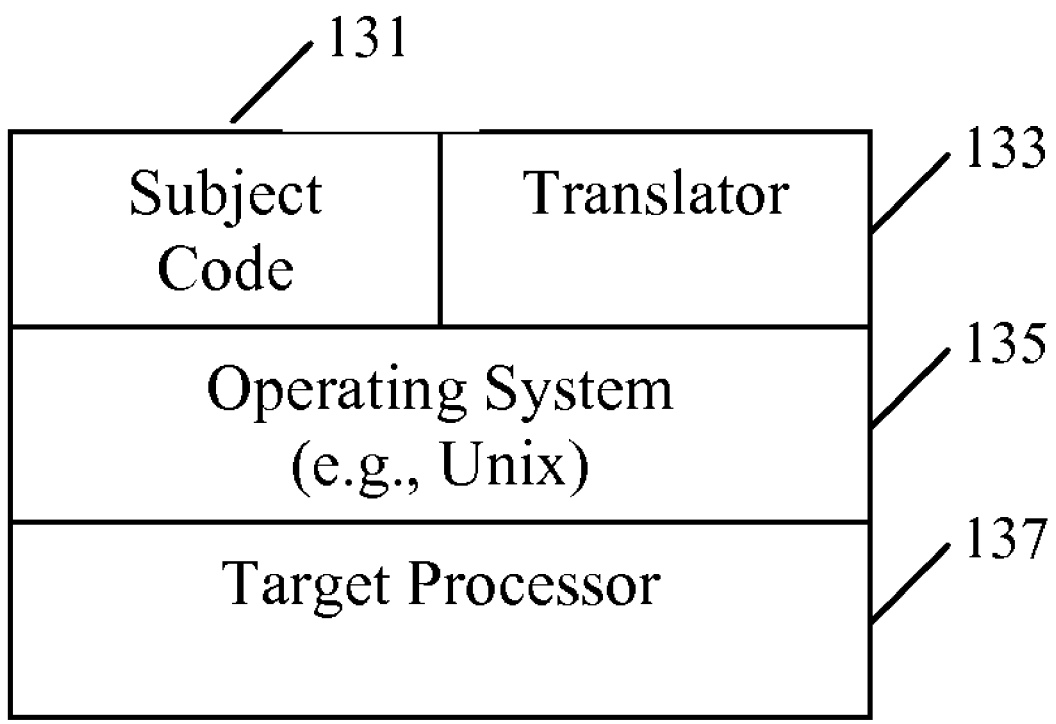
FIG. 17 is a schematic diagram of an illustrative computing environment illustrating source code implementation of condition code flag emulation.

A structure employing such an implementation of condition code flag emulation as described herein is illustrated in FIG. 17. As shown, compiled native subject code to be translated is shown residing in appropriate memory storage 131, the particular and alternative memory storage mechanisms being well-known to those skilled in the art. The translator code, i.e., the compiled version of the source code implementing the translator, is similarly resident on appropriate computer storage medium 133. The translator runs in conjunction with a memory-stored operating system 135 such as, for example, UNIX running on the target processor 135, typically a microprocessor or other suitable computer. It will be appreciated that the structure illustrated in FIG. 25 is exemplary only and that, for example, methods and processes according to the invention may be implemented in code residing within an operating system. The subject code, translator code, operating system, and storage mechanisms may be any of a wide variety of types, as known to those skilled in the art.

The collections of IR nodes described herein are colloquially referred to as "trees". We note that, formally, such structures are in fact more appropriately referenced as directed acyclic graphs (DAGs). The formal definition of a tree requires that each node have at most one parent. Because the embodiments described use common subexpression elimination during IR generation, nodes will often have multiple parents. For example, the IR of a flag-affecting instruction result may be referred to by two abstract registers, those corresponding to the destination subject register and the flag result parameter.

Abstract Registers

In the embodiment under discussion, the generation of IR trees is implemented using a set of abstract registers. These abstract registers correspond to specific features of the subject architecture. For example, there is a unique abstract register for each physical register on the subject architecture. Similarly, there is a unique abstract register for each condition code flag present on the subject architecture. Abstract registers serve as placeholders for IR trees during IR generation. For example, the value of subject register % r2 at a given point in the subject instruction sequence is represented by a particular IR expression tree, which is associated with the abstract register for subject register % r2.

In this example, the translator has already generated IR trees corresponding to the values of % r2 and % r3 while parsing the subject instructions that precede the "add" instruction. In other words, the subexpressions that calculate the values of % r2 and % r3 are already represented as IR trees. When generating the IR tree for the "add % r1, % r2, % r3" instruction, the new "+" node contains references to the IR subtrees for % r2 and % r3. In a C++ source code embodiment, an abstract register is implemented as a C++ object, which is associated with a particular IR tree via a C++ reference to the root node object of the that tree.

Flag Parameter Abstract Registers

Special-purpose abstract registers are used to store the values of the parameters (operands) of the most recent flag-affecting instruction. These flag parameter abstract registers are limited in number, to the largest number of operands used by any flag-affecting instruction on that subject architecture. For example, on the x86 architecture, all flag-affecting instructions operate on at most two operands so two flag parameter abstract registers are used. The first flag parameter abstract register ("P1") holds the first operand of the most recent flag-affecting instruction, the second flag parameter abstract register ("P2") holds the second operand of the most recent flag-affecting instruction, and so forth. The semantic conventions of what constitutes the "first" and "second" parameters for a particular flag-affecting instruction type are defined internally by the translator. The translator simply defines one set of arbitrary conventions and uses them consistently in both IR generation and translated code generation.

When a subject flag-affecting instruction is encountered during translation, the flag parameter abstract registers are changed to refer to the IR trees of that instruction's subject register operands. For example, on the x87 architecture, when the instruction "add % r1, % r2, % r3" is parsed by the emulator, P1 and P2 are set to the IR trees currently held by the abstract registers for subject registers % r2 and % r3, respectively. At the same time, the instruction type "add" is recorded as the most recent flag-affecting instruction type.

The key is that the IR trees corresponding to the instruction operands have already been created, so using their values does not require additional computation and no additional IR trees are generated. This is computationally efficient as the emulator records the operand values by simply creating a reference to existing IR trees, rather than creating new trees. By comparison, an explicit calculation of a flag value would require generation of a new IR tree (based on the flag parameters), which would ultimately result in the generation of additional instructions to implement that calculation in the translated code.

Implicit Flag Resolution

In the embodiment under discussion, program code conversion is performed dynamically, at run-time, while the translated program is running. The emulator code runs inline with the translated program. The execution path of the translated program is a control loop comprising the steps of: executing emulator code which translates a block of the subject code, and then executing that translated code block. The end of each block of translated code includes target instructions that return control to the emulator code. In other words, the steps of translating and then executing the subject code are interlaced, such that only portions of the subject program are translated at a time.

On architectures that contain condition code flags, the definitions and uses of flag values are an essential element of the instruction set semantics. As such, correct translation of a subject program to a different target architecture requires emulation of the semantics of condition code flags. Failure to do so results in a translated program that does not execute correctly, meaning the semantics are not the same as the subject program.

In some cases, the semantics of the subject flag-using instruction can be emulated without an explicit calculation of the flag value. In these cases, the emulator can generate translated code to emulate a subject flag-using instruction based on the type and operand values of the previous flag-affecting instruction. Hence, condition code flags can be emulated more efficiently using translated code which does not explicitly calculate the values of those flags. Such emulation without explicit calculation is termed "implicit resolution." Implicit resolution of condition code values saves the execution cost of explicitly calculating a particular flag value.

Often a subject flag-using instruction can be translated using target code that reproduces the semantics of the flag-using instruction using the prior flag-affecting instruction's operands rather than the explicit flag value. This is based on knowledge of the combined semantics of the flag-affecting and flag-using instructions, and emulation of those semantics using an appropriate target instruction idiom. This technique avoids an explicit calculation of the value of the flag itself. Hence, the semantics of subject flag-using instructions can be translated more efficiently.

For example, the following subject instruction sequence might appear on the x86 architecture:
[instructions calculating the values of x86 registers $eax and $ebx]
. . .
 sub $eax, $ebx
 bz #NEXT
In this case, "sub" is a flag-affecting instruction which affects the value of the zero flag and "bz" is a flag-using instruction which uses the value of the zero flag. Specifically, the "sub" instruction sets the zero flag if the result of subtracting $ebx from $eax is zero, and the "bz" instruction performs a branch if the zero flag is set. The semantics of this instruction sequence are: conditional branch to address "#NEXT" if the values of registers $eax and $ebx are equal. In this example, $eax and $ebx are the operand registers of the flag-affecting instruction "sub."

In this example, the MIPS "beq" (branch if equal) instruction can be used to emulate both subject instructions simultaneously, using the parameters of the flag-affecting instruction rather than the explicit flag value. For example, the implicit flag optimization may translate the above x86 instruction sequence as:
[instructions calculating the values of subject registers $eax and $ebx, and storing them in target registers $r1 and $r2, respectively]
. . .
 beq $r1, $r2
The flag instructions are therefore emulated without calculating the flag value explicitly. The target idiom thus reproduces the semantics of the subject instructions, based on the combined semantics of the flag-affecting and flag-using instructions, and the parameters of the flag-affecting instruction.

Figure 14:
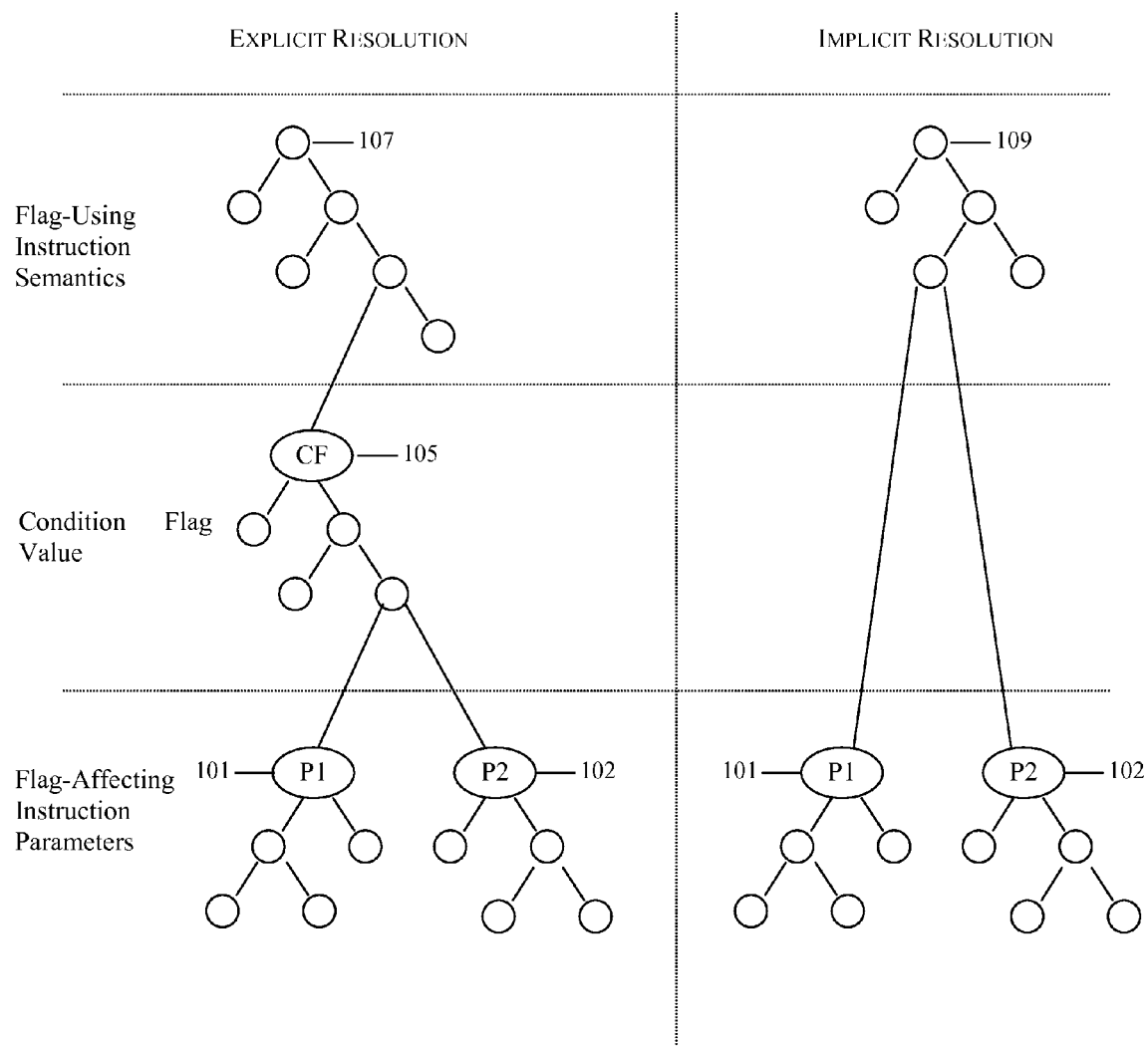
FIG. 14 is a schematic diagram contrasting explicit and implicit flag resolution.

FIG. 14 illustrates the difference between explicit and implicit condition code flag resolution for an arbitrary flag-affecting and flag-using instruction sequence. In explicit flag resolution, the IR tree that emulates the flag-using instruction contains three components. At the bottom of the figure are the IR sub-trees 101, 103 for the values of the subject register operands (i.e., parameters) used by the flag-affecting instruction, with root nodes labeled "P1" and "P2." As discussed above, these IR 101, 103 trees are already generated by the translator, independent of condition code flag emulation. In the middle of the figure is the IR sub-tree 105 for the explicit calculation of the flag value, with root node labeled "CF." The root node CF represents the value of the particular condition code flag (0 or 1). Because calculation of the condition flag is based on the values of the flag-affecting instruction parameters, tree CF includes sub-trees P1 and P2. At the top of the figure is the IR tree implementing the semantics of the flag-using instruction. In the explicit resolution scenario, the implementation of the flag-using instruction is based on the explicitly calculated flag value, hence this tree includes sub-tree CF.

In the implicit flag resolution scenario, shown in the right-hand side of FIG. 14, the IR tree that emulates the flag-using instruction contains only two components. At the bottom are the IR trees 101, 102 for the parameters P1, P2 of the flag-affecting instruction. At the top is the IR tree 109 that implements the combined semantics of the flag-using and the flag-affecting instructions. Such a tree 109 is generally simpler than its explicit resolution counterpart 107. As such, the target code generated from such an implicit resolution tree 109 is more efficient. Often, an explicit calculation and representation of the flag value itself is not necessary, either in the IR or in the translated code.

Propagation Between Basic Blocks

In the embodiment under discussion, it proves useful to decode instructions in basic block units. State is passed from one basic block to the next using a memory region which is accessible to all translated code sequences, namely, a global register store. At the end of a basic block, the values of each abstract register, each of which corresponds to a particular subject register, are stored from target registers into the global register store. At the beginning of each basic block, the abstract register values are loaded from the global register store into target registers, as the abstract register values are needed.

In embodiments where code is translated in basic block units, condition code flag emulation requires that flag state also be passed from one basic block to the next. As such, the global register store includes locations for condition code flag abstract registers and flag parameter abstract registers.

Figure 15:
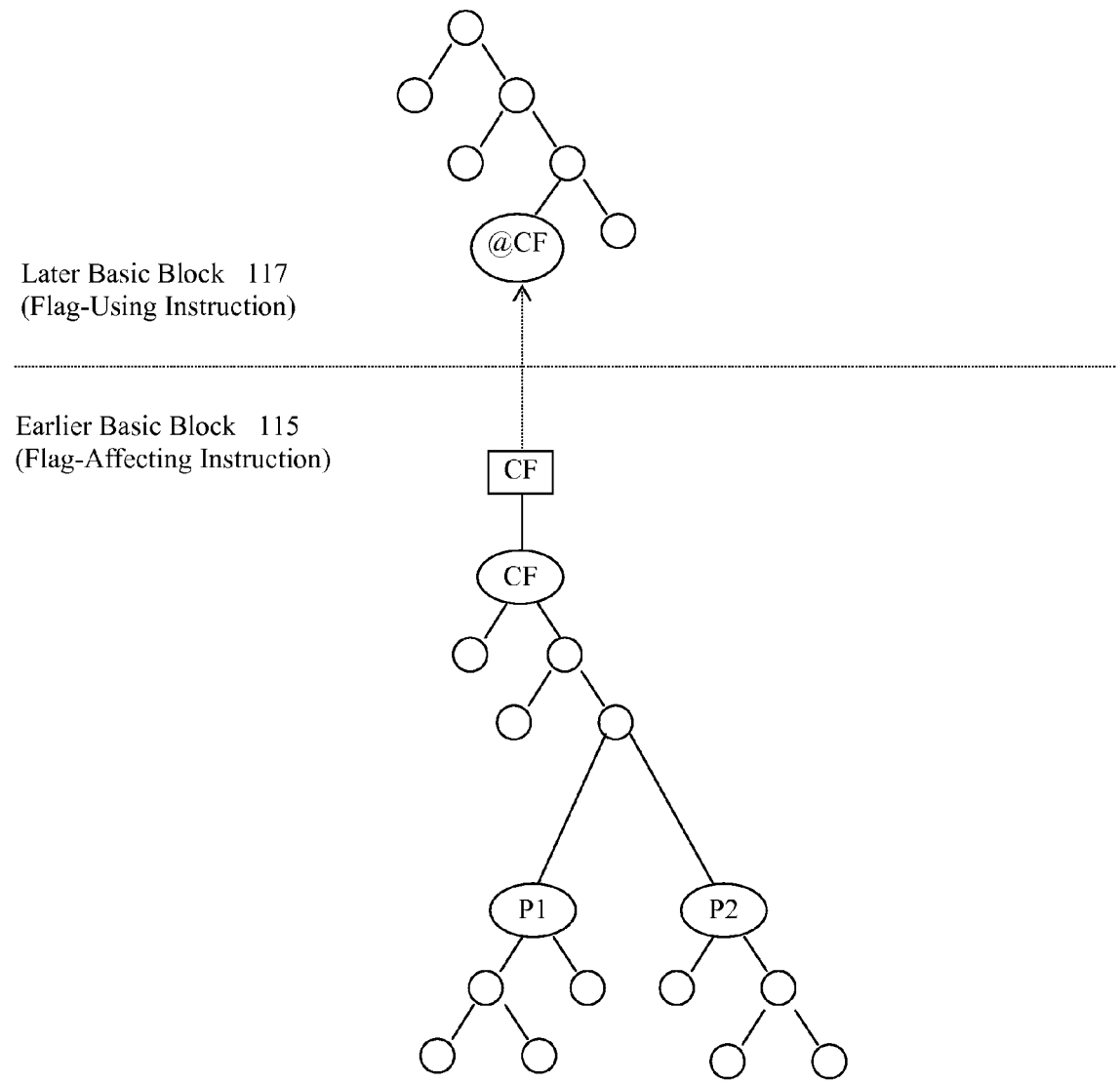
FIG. 15 is a schematic diagram illustrating normalized explicit resolution.

FIG. 15 shows an example of the IR trees corresponding to explicit condition code flag resolution where the flag-affecting instruction appears in a different basic block than the flag-using instruction. By way of a legend for FIGS. 15 and 16, a rectangular node represents an abstract register, whose value is recorded to the global register store at the end of a basic block; an oval node labeled with the "@" symbol indicates a reference to a stored abstract register, whose value is retrieved from the global register store.

In the example of FIG. 15, the IR (and corresponding translated code) to calculate the value of the condition flag is generated in a first basic block 115 where the flag-affecting instruction is encountered, while the IR to emulate the flag-using instruction is generated in a second basic block 117 where the flag-using instruction is encountered.

The root node of the IR sub-tree calculating the value of the condition flag is represented in FIG. 23 by the oval node labeled "CF." During generation of the IR, this tree is held by the corresponding condition flag abstract register, represented in FIG. 23 by the rectangle labeled "CF." This IR is used to generate translated code in the first basic block. At the end of the first basic block 115, the translator inserts (target) code to store the calculated flag value into the global register store location corresponding to the particular condition flag abstract register. When the flag is explicitly calculated and recorded in the global register store it is said to be "normalized."

In the second basic block 117, the translator generates translated (target) code from the IR that emulates the flag-using instruction using the already calculated flag value. Prior to this operation, the translator inserts (target) code to retrieve the calculated flag value from the global register store, which is represented in the figure by the IR node labeled "@CF." Thus, in terms of the translated program, the flag value is calculated and stored in the first basic block 115, and the flag value is retrieved and used in the second basic block 117.

Lazy Evaluation

In the embodiment under discussion, condition code flag emulation is implemented using lazy evaluation, such that the requisite IR trees and translated code are generated as late as possible. "Lazy evaluation" means that the generation of IR trees and translated code for condition code flag emulation is deferred until a flag-using instruction is encountered. Often, for a given flag, multiple flag-affecting instructions are encountered before a flag-using instruction is encountered, in which case all of the flag-affecting instructions except the last may be ignored. If flag values are normalized (calculated) every time a flag-affecting instruction is encountered, the translator will incur unnecessary costs in translation (generating IR and translated code) and execution (executing translated code).

As noted, lazy evaluation defers the generation of IR and translated code until a flag-using instruction is encountered. When a flag-affecting instruction is encountered, the information that will later be needed to emulate a flag-using instruction is recorded. In the embodiment under discussion, the information recorded is the instruction type and the subject register operand(s) of the flag-affecting instruction. When the information recorded following a flag-affecting instruction is the explicitly calculated flag value, the flag is said to "normalized." When the information recorded following a flag-affecting instruction is the type and operands of that instruction, the flag is said to be "pending," as no additional calculations have taken place and the flag values themselves have not been resolved.

The abstract registers used to store the condition flag value, on the one hand, and the flag parameter values, on the other hand, are used in a mutually exclusive manner. When a flag is normalized, the corresponding condition flag abstract register is defined but the corresponding flag parameter abstract registers are undefined. When a flag is pending, the corresponding condition flag abstract register is undefined and the corresponding flag parameter abstract registers are defined.

Figure 16:
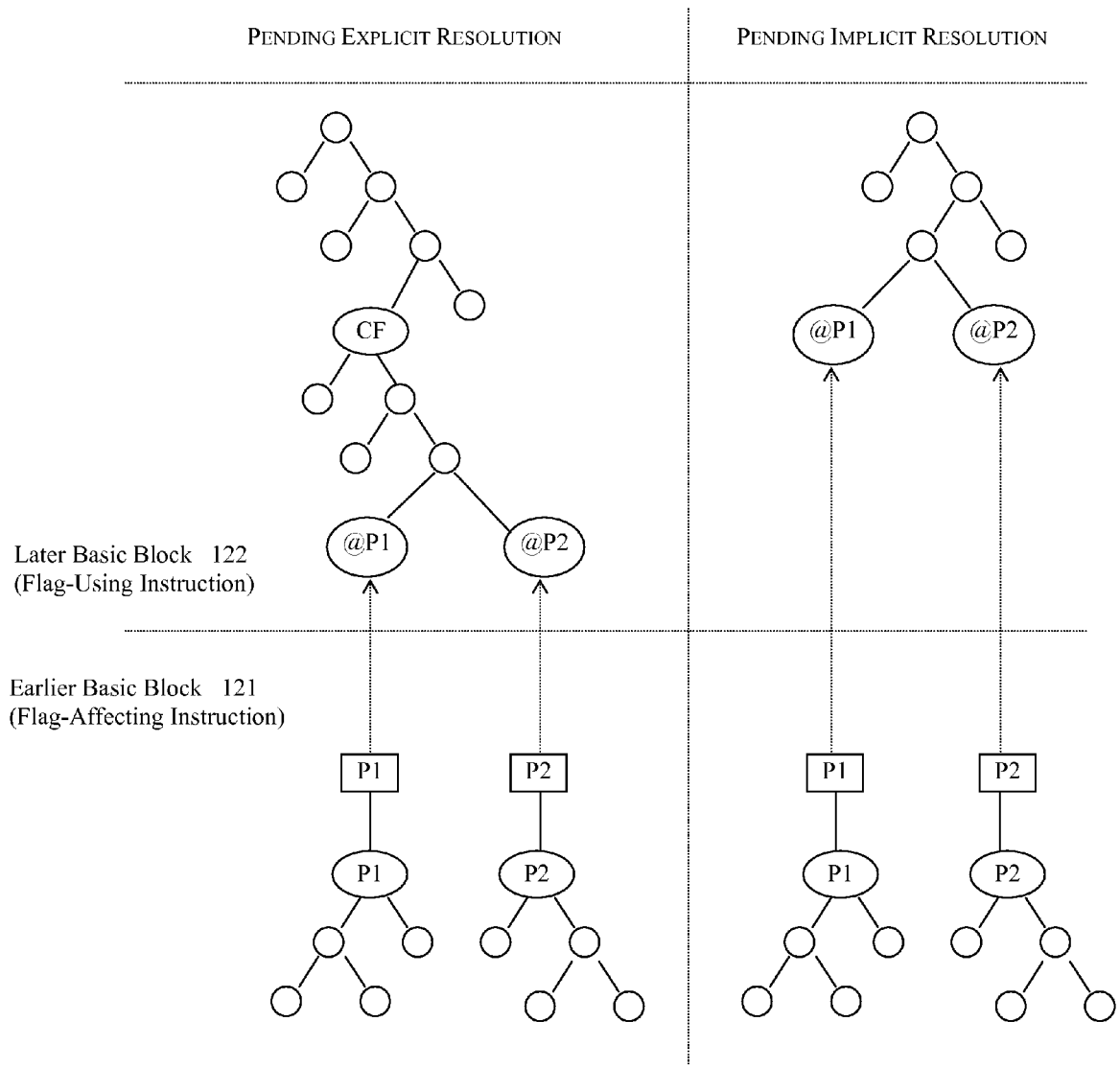
FIG. 16 is a schematic diagram illustrating pending explicit and pending implicit flag resolution.

FIG. 16 illustrates the generation of IR trees to explicitly and implicitly emulate a flag-using instruction using lazy evaluation. In the first basic block 121, the parameter values are calculated. At the end of the first basic block 121, the parameter values are recorded into the global register store at the locations reserved for flag parameter abstract registers. In either of the second basic blocks 122, 123, the flag-using instruction is emulated using the already calculated flag parameter values. Prior to this, the translator inserts target code to retrieve the flag parameter values from the global register store, which is represented in the figure by the IR nodes labeled "@P1" and "@P2."

As discussed above, when a flag value is normalized, the calculated flag value is saved across basic block boundaries. When a flag value is pending, the flag parameters and flag-affecting instruction type are saved across basic block boundaries. The flag parameters are saved in flag parameter abstract registers within the global register store, as they are dynamic values which can only be determined during execution of the translated code. The flag-affecting instruction type is recorded within the translator, as the instruction type is a static value which can be determined during translation.

Whether a condition code flag is resolved explicitly (block 122) or implicitly (block 123) affects the configuration of the IR tree generated to implement the flag-affecting and flag-using instructions. Whether condition code flag resolution is pending or normalized determines when that IR tree (and corresponding translated code) is generated.

Figure 13:
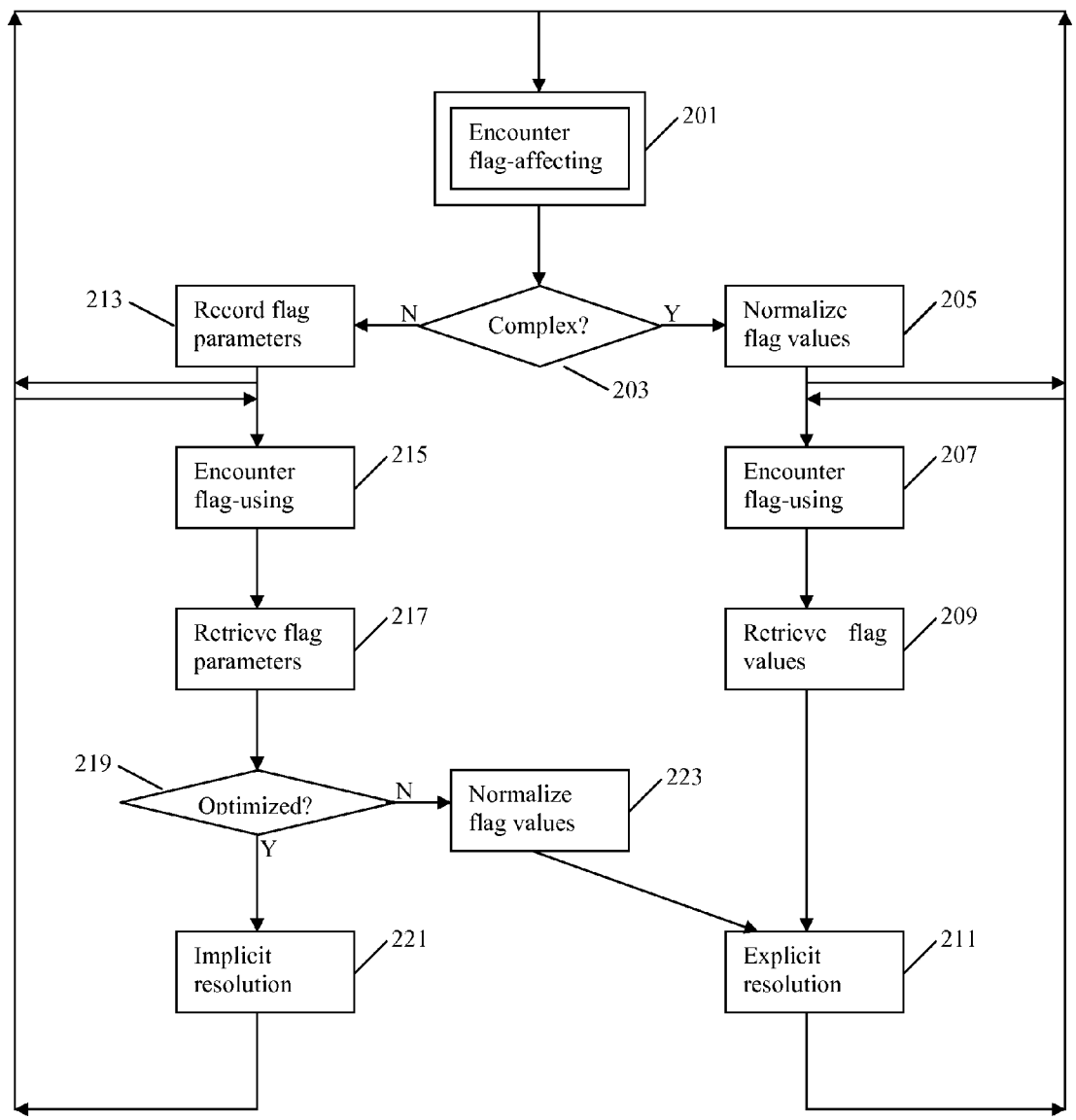
FIG. 13 is a flow diagram illustrating the steps of condition code flag emulation process.

FIG. 13 is a flowchart depicting the steps of condition code flag emulation. First, the translator encounters a flag-affecting instruction 201 in the subject code. In some cases, the flag-affecting instruction semantics are too complex 203 to resolve implicitly, in which case the translator normalizes the flag values 205, by generating target code to explicitly calculate and record the flag values. "Recording" the flag values may consist of storing them in target registers, if a flag-using instruction occurs in the same basic block, or storing them in memory in the global register store, if the next flag-using instruction occurs in a different basic block. At this point, if another flag-affecting instruction is encountered, the translator returns to step 201. If, however, a flag-using instruction is encountered 207, then the translator retrieves the flag values 209 and emulates the flag-using instruction semantics based on the explicit flag values 211.

If the flag-affecting instruction is not too complex 203, it is a candidate for the implicit resolution optimization. When a candidate flag-affecting instruction is encountered, its operands are recorded 213 in the flag parameter abstract registers, and its static instruction type is recorded within the translator. At this point, if another flag-affecting instruction is encountered, the translator returns to step 201. If, however, a flag-using instruction is encountered 215, then the translator retrieves the flag parameters 217. If the implicit resolution optimization is available for that particular flag-using instruction 219, then the translator emulates the instruction's semantics implicitly 221 based on the flag parameters. For example, implicit resolution is generally available for conditional branch instructions. If implicit resolution is not available for that flag-using instruction, then the flag parameters are used to calculate the flag values explicitly 223 and the flag-using instruction semantics are emulated based on the explicit flag values 211.

Multiple Pending Instructions

While some flag-affecting instructions affect the full set of condition code flags, other instructions may affect only a subset of flags. For example, in the following x86 instruction sequence:

sub eax, ebx
dec eax the "sub" (subtract) instruction affects the full set of condition flags, and the "dec" (decrement) instruction affects a subset of flags. To resolve the values of a condition flag after such an instruction sequence potentially requires information from both instructions, as some flags are defined by the "dec" instruction but other flags are defined by the "sub" instruction. To avoid normalizing the flags, information from both instructions must be recorded. In one embodiment, two or more sets of flag parameters (i.e., the type, operands, and result of the flag-affecting instruction) are stored, such that flags can be left in a pending state even when multiple instructions are needed to resolve their values.

In this example, when the "sub" instruction is encountered, the first set of flag parameters is recorded as follows: "sub" is the instruction type, subject register "eax" is the first operand, and subject register "ebx" is the second operand. When the "dec" instruction is encountered, the second set of flag parameters is recorded as follows: "dec" is the instruction type, subject register "eax" is the first operand, and the second operand is undefined. If a flag-affecting instruction which affects the full set of condition code flags is then encountered, both (all) sets of flag parameters are cleared and the new instruction's parameters are recorded as the first set.

Lazy Propagation

Flag parameters correspond to the values of the subject registers used by the flag-affecting instruction, at the time the flag-affecting instruction is "executed" in the subject program. In terms of the subject program state, when the later flag-using instruction is encountered, one or more of the flag parameters may still reside in subject registers. In this situation, the flag parameter is said to be "live" in the particular subject register. Whether this happens in a given case depends on the particular subject instruction sequences of the subject program.

As discussed above, if a flag is pending at the end of a basic block, the translator inserts code to record the values of the flag parameters into the global register store, so that they can be retrieved by later basic blocks if needed. In the embodiment under discussion, subject register values are always synchronized at the end of a basic block by saving them to the global register store. If a flag parameter is still live in a particular subject register at the end of a basic block, then the values of the flag parameter abstract register and the subject register abstract register are identical. Instead of saving a duplicate value to the global register store, in this scenario the translator internally records which subject register the flag parameter is stored in. This avoids the execution cost of storing the flag parameter abstract register at the end of the first basic block.

In subsequent basic blocks, when the flag parameter value is needed, it is retrieved from the global register store at the location for the subject register holding it, rather than the location for the flag parameter abstract register. If value of the subject register changes such that the flag parameter is no longer live, then the translator inserts code to retrieve the flag parameter from the subject register (and re-record it at the flag parameter global register store location if necessary).

Result Parameter

In the embodiment under discussion, implicit condition code flag resolution is based on the result of the flag-affecting instruction, as well as the type and operands of the flag-affecting instruction. In this embodiment, an additional abstract register is used to hold the value of the result parameter. The global store includes a location to hold the value of the result parameter abstract register, which is saved to and restored from as necessary.

As with the flag operand parameters, the result parameter corresponds to the actual value of a subject register at some point in time. As such, the lazy evaluation optimization discussed above, applicable when a value happens to still be "live" in a subject register, is also applied to the saving and restoring of the result parameter abstract register.

Figure 12:
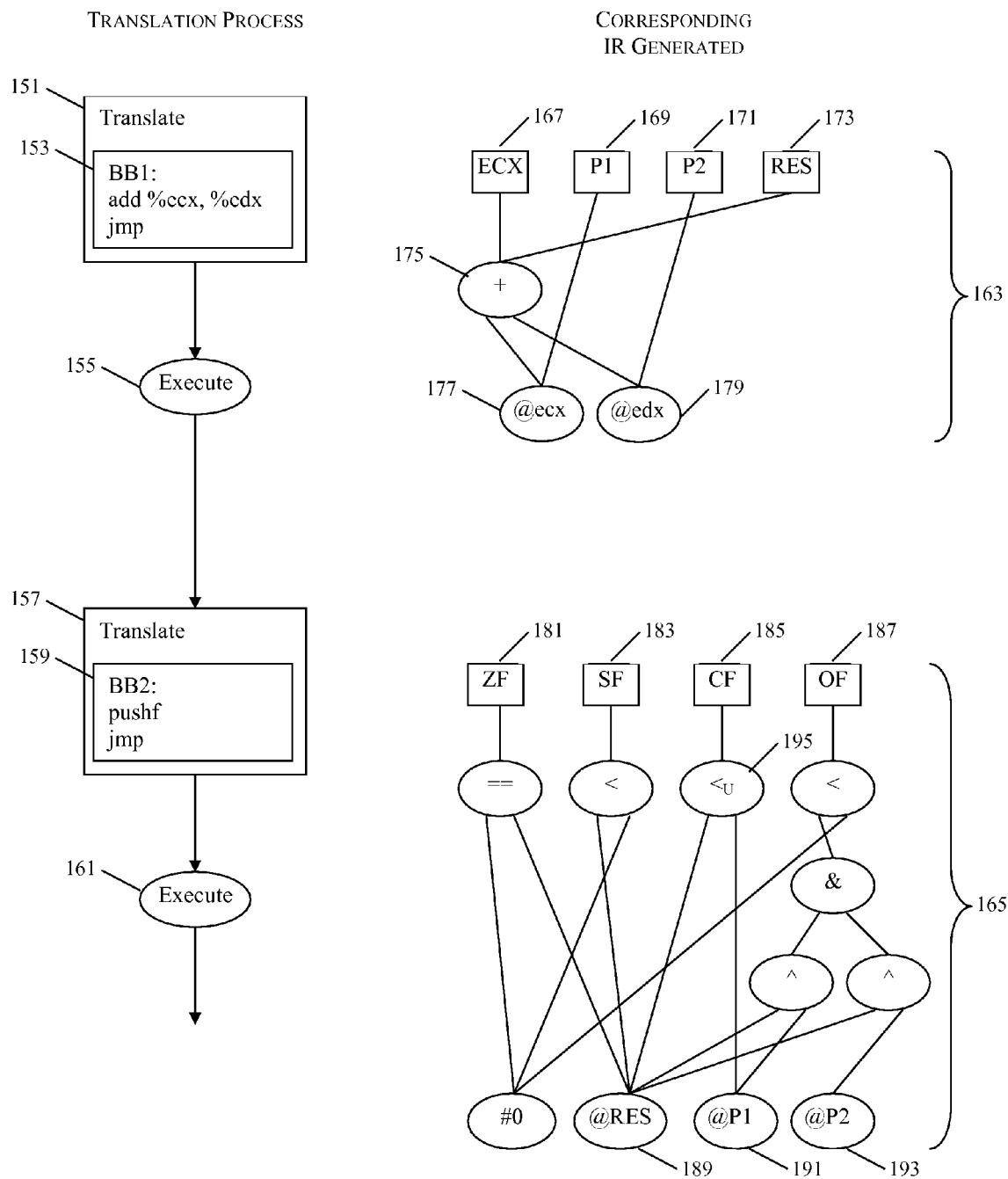
FIG. 12 is a schematic diagram illustrating a translation process and corresponding IR generated during the process.

FIG. 12 shows the translation of two basic blocks of x86 instructions, and the corresponding IR trees that are generated in the process of translation. The left side of FIG. 12 shows the execution path of the emulator during translation. The emulator translates 151 a first basic block of subject code 153 into target code and then executes 155 that target code. When the target code finishes execution, control is returned to the emulator 157. The emulator then translates 157 the next basic block of subject code 159 into target code and executes 161 that target code, and so on.

In the course of translating 151 the first basic block of subject code 153 into target code, the emulator generates an IR tree 163 based on that basic block. In this case, the IR tree 163 is generated from the source instruction "add % ecx, % edx," which is a flag-affecting instruction. In the course of generating the IR tree 163, four abstract registers are defined by this instruction: the destination subject register % ecx 167, the first flag-affecting instruction parameter 169, the second flag-affecting instruction parameter 171, and the flag-affecting instruction result 173. The IR tree corresponding to the "add" instruction is simply a "+" (arithmetic addition) operator 175, whose operands are the subject registers % ecx 177 and % edx 179.

Thus, condition code flag emulation for the first basic block puts the flags in a pending state by storing the parameters and result of the flag-affecting instruction. The flag-affecting instruction is "add % ecx, % edx." The parameters of the instruction are the current values of emulated subject registers % ecx 177 and % edx 179. The "@" symbol preceding the subject register uses 177, 179 indicate that the values of the subject registers are retrieved from the global register store, from the locations corresponding to % ecx and % edx, respectively, as these particular subject registers were not previously loaded by the current basic block. These parameter values are then stored in the first 169 and second 171 flag parameter abstract registers. The result of the addition operation 175 is stored in the flag result abstract register 173.

After the IR tree is generated, the corresponding target code is generated based on the IR. The process of generating target code from a generic IR is well understood in the art. Target code is inserted at the end of the translated block to save the abstract registers, including those for the flag result 173 and flag parameters 169, 171, to the global register store. After the target code is generated, it is then executed 155.

In the course of translating 157 the second basic block of subject code 159, the emulator generates an IR tree 165 based on that basic block. The IR tree 165 is generated from the source instruction "pushf," which is a flag-using instruction. The semantics of the "pushf" instruction are to store the values of all condition flags onto the stack, which requires that each flag be explicitly calculated. As such, the abstract registers corresponding to four condition flag values are defined during IR generation: the zero flag ("ZF") 181, the sign flag ("SF") 183, the carry flag ("CF") 185, and the overflow flag ("OF") 187. Node 195 is the arithmetic comparison operator "unsigned less-than". The size of the IR tree 165 illustrates the complexity and computational expense of calculating explicit flag values. The calculation of the condition flags is based on information from the prior flag-affecting instruction, which in this case is the "add % ecx, % edx" instruction from the first basic block 153. The IR calculating the condition flag values 165 is based on the result 189 and parameters 191, 193 of the flag-affecting instruction. As above, the "@" symbol preceding the flag parameter labels indicates that the emulator inserts target code to load those values from the global register store prior to their use.

Thus, the second basic block forces the flag values to be normalized. After the flag values are calculated and used (by the target code emulating the "pushf" instruction), they will be stored into the global register store. Simultaneously, the pending flag abstract registers (parameters and result) are put into an undefined state to reflect the fact that the flag values are stored explicitly (i.e., the flags have been normalized).

Sticky Flags

Some architectures include so-called "sticky flags," which are set when a particular event occurs, but can only be cleared by an explicit request. For example, in the PowerPC architecture, the summary overflow flag is set whenever an instruction sets the overflow flag. Unlike the overflow flag which is redefined (to 0 or 1) on every mathematical instruction, the summary overflow flag can only be cleared by special instructions provided for that explicit purpose. Thus, even if multiple flag-affecting instructions occur in sequence before the flag-using instruction, the sticky flag value may be need to evaluated for all such flag-affecting instructions.

In one embodiment, sticky flag values are explicitly calculated for each flag-affecting instruction. In another preferred embodiment, sticky flag values are emulated using a stack of flag-affecting instructions, all of which are evaluated when a sticky flag-using instruction is encountered. In another embodiment, the stack of sticky flag-affecting instructions is evaluated when the number of accrued instructions reaches a predetermined limit.

The emulation of sticky flags can be optimized from the observation that if evaluation of one flag-affecting instruction results in the sticky flag being set, then the other flag-affecting instructions need not be evaluated. In one embodiment, the stack of flag-affecting instructions is evaluated in order of simple instructions first, meaning the subject flag-affecting instructions whose translation results in the fewest target instructions. In another embodiment, simple sticky flag-affecting instructions are evaluated as they are encountered, and only complex sticky flag-affecting instructions are put on the instruction stack.

Non-Register Parameters

While flag parameters often correspond to subject registers, some flag-affecting instructions may use operands that are not held in subject registers. For example, on the x86 architecture, shift instructions contain a shift magnitude field which is encoded directly into the instruction itself. In other words, while the shift magnitude field is a parameter of the flag-affecting instruction, it is not held in a subject register. However, such non-register parameters can still be represented as IR nodes, and can still be held in flag parameter abstract registers. In the example of the x86 shift instruction, because the shift magnitude value is encoded in the subject instruction, it can be statically determined at translation time. That value would be encoded as constant-type IR node, which can then be associated with the appropriate flag parameter abstract register.

Selective Optimization

The implementation of implicit flag resolution is idiom-based, in the sense that there is often some target instruction or instruction sequence that captures the semantics of the subject instruction pair (the flag-affecting and flag-using instructions in combination) with particular efficiency. The effectiveness of this optimization thus depends on how closely instructions in the target architecture mirror the semantics of the particular subject flag-using instruction.

As with any idiomatic implementation, performance comes at the cost of complexity. As the number of target idioms recognized by the translator goes up, the complexity and running time of the translator increases. Accordingly, a fully idiomatic translator, meaning one which exploits every possible target idiom, would generate the most optimal translated code but would also be very computationally expensive. A fully idiomatic implementation also requires a significant implementation effort, most of which is not transferable to (i.e., reusable on) other target architectures.

Because of the constraints associated with performing code translation at run-time (i.e., algorithm simplicity and low translation cost) it is advantageous to identify a subset of target idioms which have the most significant impact on translated code performance, meaning that in practice they are encountered more frequently than others. The judicious use of implicit flag resolution relies on the observation that in practice certain flag-using instructions are executed more frequently than others. Providing idiomatic implementations for only these particular flag-using instructions can significantly reduce the execution cost of translated code without an explosion in translation cost (or in the cost of implementing the translator). As such, it is advantageous to identify which subject flag-affecting and flag-using instructions occur the most frequently.

In one embodiment, implicit condition code flag resolution is used only for particular flag-using instructions, or for particular combinations of flag-affecting and flag-using instructions. One embodiment of the present invention implements implicit condition code flag resolution only for the flag-affecting and flag-using instructions that occur the most frequently. For example, the subject instruction sequence of a logical comparison instruction followed by a conditional branch instruction occurs frequently. To say that an instruction sequence "occurs" frequently means that the sequence is often generated in the output of compilers for that particular subject architecture. In this case, the comparison and condition branch sequence is used frequently by compilers because it is a concise implementation of a logical decision. For example, on the x86 architecture, the example instruction sequence shown above:

sub $eax, $ebx
bz #NEXT is a common instruction sequence, because the corresponding semantics, "branch if A equals B," are a common element of control flow used by computer programs.

As noted, a considerable advantage accrues from avoiding explicit calculation of condition code flags, which can be very expensive in terms of execution cost (of target code generated). To illustrate, the bottom-right FIG. 12 shows the IR needed to calculate the values of the four condition flags affected by the x86 flag-affecting instruction "add % ecx, % edx". The IR trees for the zero flag ("ZF"), sign flag ("SF"), carry flag ("CF"), and the overflow flag ("OF") contain logical expressions that are based on the parameters ("@P1" and "@P2") and the result ("@RES") of the flag-affecting instruction. The "@" symbol indicates that the respective values are loaded from the global register store, as the flag-affecting instruction in this example was encountered in a previous basic block; if the flag-affecting instruction occurred in the same basic block, those nodes would instead contain references to IR subtrees.

The preferred embodiments of the invention have been described in the context of an emulator performing program code conversion for the purposes of translation between non-compatible computing environments. However, the principles of the invention are also applicable to fields such as program code conversion for the purposes of optimisation, wherein a subject processor and a target processor have a compatible architecture.

The emulation method described herein is apt to be recorded on a computer readable recording medium as a computing program for performing the method. The invention also extends to an emulator apparatus, and to a computing platform, for performing the emulation method.

The present invention has many advantages as will be apparent from the description above, and as will be apparent to the skilled person through practice of the invention. In particular, flag emulation is performed efficiently and cost effectively, even for highly non-compatible subject and target processor environments.

What is claimed is:

1. Computer software resident on a tangible computer readable storage medium and operable when executed by a computer to perform program code conversion comprising the steps of:
    (a) establishing one or more abstract registers, each corresponding to a unique flag parameter (operand) used by a flag-affecting instruction which selectively modifies a flag;
    (b) generating an intermediate representation (IR) tree for a selected instruction sequence, said selected instruction sequence followed by a flag-using instruction which uses said flag, said IR tree depending from the one or more of said abstract registers;
    (c) responding to a first flag-affecting instruction in said selected instruction sequence to cause a flag parameter abstract register to refer to said IR tree generated at step (b); and
    (d) resolving, in response to detecting said flag-using instruction, a status of said flag with respect to said flag parameter abstract register.

2. Computer software resident on a tangible computer readable storage medium and operable when executed by a computer to perform program code conversion the steps of:
- generating a first intermediate representation for a sequence of instructions, said sequence of instructions including a plurality of flag-affecting instructions which selectively modify a flag followed by a flag-using instruction which uses the flag;
- storing a reference to nodes of the first intermediate representation representing operands of an identified flag-affecting instruction of said sequence of instructions;
- generating a second intermediate representation for condition code flag emulation in response to detecting said flag-using instruction; and
- resolving, in response to detecting said flag-using instruction, a status of said flag with respect to said stored reference and said first and second intermediate representations.

3. The software of claim 2 further operable to generate an intermediate representation in a basic block mode and to save flag parameters and a flag-affecting instruction type across a basic block boundary.

4. The software of claim 3 wherein the flag-affecting instruction type is saved within the translator.

5. The software of claim 4 wherein the flag parameters are saved in flag parameter abstract registers.

6. The software of claim 5 wherein said flag parameter abstract registers reside in a global register store.

7. The software of claim 6 further including the steps of responding to the case where a flag parameter is still alive in a subject register at the end of a basic block by recording identity of said subject register rather than saving a duplicate value.

8. Computer software resident on a tangible computer readable storage medium and operable when executed by a computer to perform program code conversion comprising the steps of:
- translating a sequence of instructions, said sequence of instructions including a plurality of flag-affecting instructions which selectively modify a flag followed by a flag-using instruction which uses said flag;
- recording parameters of said plurality of flag-affecting instructions including an instruction type parameter and one or more operand parameters;
- deferring a condition code flag translation until said flag-using instruction is encountered and;
- resolving, in response to detecting said flag-using instruction, a status of said flag with respect to said recorded parameters of said plurality of flag-affecting instructions.

9. The software of claim 8 wherein said computer further resolves a flag value based on the instruction type parameter and the one or more operand parameters.

10. Computer software resident on a tangible computer readable storage medium and operable when executed by a computer to perform program code conversion comprising the steps of:
- translating a sequence of instructions, said sequence of instructions including a plurality of flag-affecting instructions which selectively modify a sticky flag followed by a flag-using instruction which uses said sticky flag;
- recording parameters of said plurality of flag-affecting instructions including an instruction type parameter and one or more operand parameters;
- deferring a condition code flag translation until said flag-using instruction is encountered, further including a step of using a stack of flag-affecting instructions in emulation of said sticky flag; and
- resolving, in response to detecting said flag-using instruction, a status of said sticky flag with respect to said recorded parameters of said plurality of flag-affecting instructions and said stack of flag-affecting instructions.

* * * * *